United States Patent
Norfolk

(10) Patent No.: US 9,441,085 B2
(45) Date of Patent: Sep. 13, 2016

(54) POLYAMIDES COMPOSITIONS FEATURING IMPROVED THERMAL STABILITY

(75) Inventor: Linda M. Norfolk, Cumming, GA (US)

(73) Assignee: SOLVAY SPECIALITY POLYMERS USA, LLC, Alparetta, GA (US)

( * ) Notice: Subject to any disclaimer, the term of this patent is extended or adjusted under 35 U.S.C. 154(b) by 0 days.

(21) Appl. No.: 14/124,540

(22) PCT Filed: Jun. 8, 2012

(86) PCT No.: PCT/EP2012/060919
§ 371 (c)(1),
(2), (4) Date: Dec. 6, 2013

(87) PCT Pub. No.: WO2012/168442
PCT Pub. Date: Dec. 13, 2012

(65) Prior Publication Data
US 2014/0114005 A1    Apr. 24, 2014

Related U.S. Application Data

(60) Provisional application No. 61/495,024, filed on Jun. 9, 2011.

(30) Foreign Application Priority Data

Aug. 4, 2011    (EP) .................................... 11176634

(51) Int. Cl.
C08K 3/02    (2006.01)
C08L 3/08    (2006.01)
C08L 77/00   (2006.01)
(Continued)

(52) U.S. Cl.
CPC .................. *C08K 3/08* (2013.01); *C08L 77/00* (2013.01); *C08L 77/06* (2013.01); *C08K 2003/0856* (2013.01)

(58) Field of Classification Search
CPC ... C08K 2003/0856; C08K 3/02; C08K 3/08
See application file for complete search history.

(56) References Cited

U.S. PATENT DOCUMENTS

| 7,763,674 | B2 * | 7/2010 | Gijsman et al. ............ 524/440 |
| 2003/0055152 | A1 * | 3/2003 | Ottenheijm .................. 524/494 |
| 2003/0092824 | A1 | 5/2003 | Bastiaens et al. |

(Continued)

FOREIGN PATENT DOCUMENTS

| EP | 287045 A2 | 10/1988 |
| EP | 592942 A1 * | 4/1994 |

(Continued)

OTHER PUBLICATIONS

EMS (CAMPUS Datasheet: Grivory G 21-PA6I/6T. EMS-Grivory. Sep. 2014, 5 pages).*

(Continued)

*Primary Examiner* — Brieann R Fink
(74) *Attorney, Agent, or Firm* — Jarrod N. Raphael; Nikhil Patel

(57) ABSTRACT

The present invention relates to polyamide compositions featuring improved thermal stability comprising at least one semi-aromatic polyamide, PA 6 and/or PA 6,6, and elemental iron. These new compositions are very well suited for the manufacture of articles exposed to high temperature environments such as articles used in automotive applications.

22 Claims, 1 Drawing Sheet

(51) Int. Cl.
*C08L 77/06* (2006.01)
*C08K 3/08* (2006.01)

(56) References Cited

U.S. PATENT DOCUMENTS

| | | |
|---|---|---|
| 2004/0022358 A1 | 2/2004 | Tomita |
| 2004/0096684 A1 | 5/2004 | Ogawa et al. |
| 2005/0119379 A1 | 6/2005 | Martens et al. |
| 2006/0011892 A1* | 1/2006 | Powers .................. 252/397 |
| 2008/0146717 A1 | 6/2008 | Gijsman et al. |
| 2008/0269378 A1 | 10/2008 | Saga |
| 2010/0113668 A1 | 5/2010 | Saga et al. |
| 2012/0214904 A1 | 8/2012 | Prusty et al. |
| 2013/0209784 A1* | 8/2013 | Nakagawa et al. ........ 428/314.8 |

FOREIGN PATENT DOCUMENTS

| | | |
|---|---|---|
| EP | 1683830 A1 * | 7/2006 |
| GB | 1147053 A | 4/1969 |
| JP | 01014271 A | 1/1989 |
| JP | 05194842 A | 8/1993 |
| JP | 11302539 A | 11/1999 |
| WO | 2005007727 A1 | 1/2005 |
| WO | 2011010290 A1 | 1/2011 |
| WO | 2011051123 A1 | 5/2011 |

OTHER PUBLICATIONS

Akulon (Akulon K123, K123/A PA6 Low Viscosity Property Data. Akulon. Jul. 2014, 1 page).*
Sigma-Aldrich (Nylon 4/6. Sigma-Aldrich. 2014, 1 page).*
Murphy J., In "Additives for Plastics Handbook", 2nd Edition, 2001, Chapter 5.2.3., p. 43-48—Elsevier Advanced Technology.
Jiang C. et al., "Effect of highly filled ferrites on non-isothermal crystallization behavior of polyamide 6 bonded ferrites", European polymer journal 2010, vol. 46, No. 11, p. 2206-2215—Elsevier Ltd.
Palmer R.J., "Polyamides, Plastics", Kirk-Othmer Encyclopedia of Chemical Technology, 2005, vol. 19, p. 772-797—Wiley.
Glasscock D. et al., "High Performance Polyamides Fulfill Demanding Requirements for Automotive Thermal Management Components", 2010, Web Mar. 17, 2010, 9 pp., http://plastics.dupont.com/plastics/pdflit/americas/zytel/HTN-whitepaper-R8.pdf.

* cited by examiner

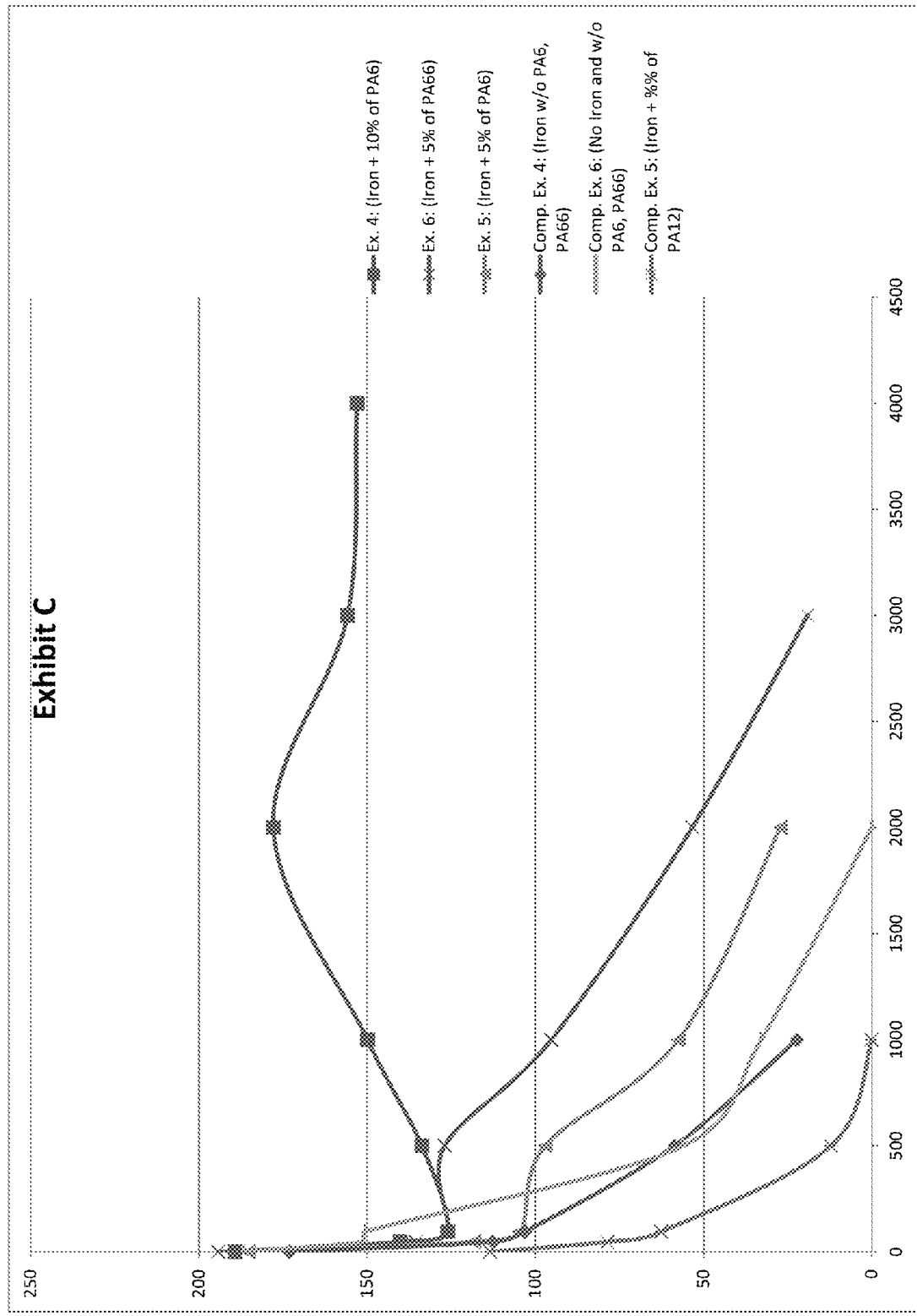

POLYAMIDES COMPOSITIONS FEATURING IMPROVED THERMAL STABILITY

This application claims priority to U.S. provisional application No. 61/495,024 filed on Jun. 9, 2011 and to European application No. 11176634.1 filed on Aug. 4, 2011, the whole content of each of these applications being incorporated herein by reference for all purposes.

The present invention relates to polyamide compositions featuring improved thermal stability. These new compositions are very well suited for the manufacture of articles exposed to high temperature environments such as articles used in automotive applications.

BACKGROUND

Semi-aromatic polyamides are a class of high-performance polyamides featuring outstanding properties such an excellent resistance to creep and fatigue, good mechanical properties, low moisture absorption, improved dimensional stability, very high strength and stiffness at elevated temperatures, as well as a great resistance to a broad range of chemicals.

Some demanding applications require a high resistance to very high temperatures. Semi-aromatic polyamides are candidates of choice for those applications, typically because of their intrinsic high melt temperatures. However, the thermal stability of those materials still needs to be improved, especially over the long term. When molded compositions are subjected to relatively high temperatures for a prolonged period, such as is the case with objects that serve in automotive under-the-hood applications and in several electric or electronic applications, the compositions generally tend to show a decrease in mechanical properties (such as tensile properties) due to thermal degradation of the polymer. This effect is called heat ageing.

Thermal stabilizers are typically added to polymer compositions to better retain the properties of the polymers upon exposure to elevated temperature. When using a thermal stabilizer, the useful lifetime of the molded material can be extended significantly, depending on the type of material, use conditions and type and amount of heat stabilizer. Examples of heat stabilizers typically used in polyamides are organic stabilizers, like phenolic antioxidants and aromatic amines, and combination of potassium iodide or copper iodide. Unfortunately, semi-aromatic polyamide compositions comprising those stabilizers do not achieve acceptable heat ageing performances that are required in some demanding applications.

It is therefore an object of the present invention to provide semi-aromatic polyamide compositions featuring a very good heat ageing performance while maintaining all the other properties of semi-aromatic polyamides at a good level.

WO 2005/007727 discloses a process for preparing heat stabilized molding compositions comprising melt-mixing of a thermoplastic polymer, a non-metallic inorganic filler and elemental iron having a weight average particle size of at most 450 μm to form a composition wherein the thermoplastic polymer forms a continuous phase and the use of those compositions in applications wherein they are exposed to elevated temperature. WO 2005/007727 claims a remarkable improvement in heat ageing properties, exhibited by a much better retention of the mechanical properties at elevated temperature, in respect of the prior art copper salt/potassium iodide or elemental copper containing compositions. WO 2005/007727 discloses aliphatic polyamides (such as PA 6, PA 6,6, and PA 4,6) compositions comprising an elemental iron thermal stabilizer. It also discloses in its example IV a composition comprising PA 6,6/6T and elemental iron.

WO 2011/051123 relates to thermoplastic molding compounds comprising a polyamide and powdered iron having a particle size of no greater than 10 μm that can be obtained by thermally disintegrating iron pentacarbonyl.

However, the use and handling of powders having very fine particle size should preferably be avoided for health and safety considerations. The risk of inhalation of fine particles raises major health concerns since it has been shown to cause lung cancer, whereas the presence of fine particles in the air presents a number of safety issues, the most dangerous one being an explosion hazard.

The Applicant has surprisingly found out that the addition of PA 6 and/or PA 6,6 to compositions comprising semi-aromatic polyamides and elemental iron having a weight average particle size of at least 10 μm leads to outstanding results regarding the heat ageing performance while maintaining all the other properties of semi-aromatic polyamides at a very good level and without the health and safety risk associated with the prior art.

BRIEF DESCRIPTION OF THE FIGURE

FIG. 1 is a graph showing the tensile strength in MPa of example E1 (according to the invention) and comparative examples CE1 and CE2 as a function of the thermal oxidative treatment time they were subjected to in hours.

DETAILED DESCRIPTION

It is a first object of the present invention to provide a polymer composition comprising at least one semi-aromatic polyamide, at least one aliphatic polyamide selected from PA 6 and PA 6,6, and elemental iron having a weight average particle size of at least 10 μm.

It is another object of the present invention to provide a process for preparing the polymer composition as above described wherein it comprises melt-mixing of at least one semi-aromatic polyamide, at least one aliphatic polyamide selected from PA 6 and PA 6,6, and elemental iron having a weight average particle size of at least 10 μm.

Still another object of the present invention relates to the use of the above mentioned composition for the preparation of a molded part and to the molded part itself.

Finally, a last object of the present invention relates to the use of such molded part in a machine, an engine, an electric or electronic installation and in particular to an automotive vehicle, general transport means, domestic appliance, or general industry installation, comprising said molded part.

the Semi-Aromatic Polyamide

The term "polyamide" is generally understood to indicate a polymer comprising units deriving from at least one diamine and at least one dicarboxylic acid and/or from at least one amino carboxylic acid or lactam.

The semi-aromatic polyamide of the composition according to the present invention is intended to denote any polyamide comprising more than 35 mol. % of aromatic recurring units. It comprises advantageously more than 55 mol. %, preferably more than 65 mol % of aromatic recurring units, more preferably more than 70 mol %, still more preferably more than 80 mol %, even more preferably more than 85 mol % and most preferably more than 90 mol %. In a specific embodiment, the semi-aromatic polyamide of the composition according to the present invention comprises 100 mol % of aromatic recurring units. For the purpose of the present invention, the term "aromatic recurring unit" is intended to denote any recurring unit that comprises at least one aromatic group. The aromatic recurring units may be formed by the polycondensation of at least one aromatic dicarboxylic acid and at least one diamine or by the polycondensation of at least one dicarboxylic acid and at least one aromatic diamine.

Non limitative examples of aromatic dicarboxylic acids are notably phthalic acids, including isophthalic acid, terephthalic acid and orthophthalic acid, naphtalenedicarboxylic acids (including 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid and 1,2-naphthalene dicarboxylic acid), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene. Phthalic acids, including isophthalic acid, terephthalic acid and orthophthalic acid, are the preferred aromatic dicarboxylic acids. Terephthalic acid and isophthalic acid are even more preferred.

Non limitative examples of aromatic diamines are notably meta-phenylene diamine, meta-xylylene diamine and para-xylylene diamine. Para-xylylene diamine is the most preferred.

The semi-aromatic polyamide of the composition according to the present invention may comprise in addition to the at least one aromatic dicarboxylic acid and/or at least one aromatic diamine described above, recurring units deriving from at least one aliphatic dicarboxylic acid and/or at least one aliphatic diamine and/or at least one lactam.

Non limitative examples of aliphatic dicarboxylic acids are notably oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tetradecanedioic acid [HOOC—(CH$_2$)$_{11}$—COOH] and 1,4-cyclohexane dicarboxylic acid, are non limitative examples of aliphatic dicarboxylic acids. Sebacic acid, adipic acid and 1,4-cyclohexane dicarboxylic acid are preferred.

Non limiting example of aliphatic diamines are notably 1,2-diaminoethane, 1,2-diaminopropane, propylene-1,3-diamine, 1,3-diaminobutane, 1,4-diaminobutane, 1,5-diaminopentane, 2-methyl-1,5-diaminopentane, 1,6-hexamethylenediamine, 2,4,4-trimethyl-1,6-hexamethylenediamine, 1,8-diaminooctane, 2-methyl-1,8-diaminooctane, 1,9 nonanediamine, 5-methyl-1,9-nonanediamine, 1,10-diaminodecane, 1,11-diaminoundecane, 1,12-diaminododecane, 1,13-diaminotridecane, 1,14-diaminotetradecane, 1,16-diaminohexadecane, 1,18-diaminooctadecane and 1-amino-3-N-methyl-N-(3-aminopropyl)-aminopropane. Among those, 1,6-hexamethylenediamine, 2-methyl-1,8-diaminooctane, 1,9 nonanediamine, 5-methyl-1,9-nonanediamine, 1,10-diaminodecane, 1,11-diaminoundecane and 1,12-diaminododecane are preferred, and 1,6-hexamethylenediamine, 1,9 nonanediamine, 1,10-diaminodecane, are even more preferred.

In a first embodiment, the semi-aromatic polyamide of the composition according to the present invention is preferably a polyphthalamide (PPA). For the purpose of the present description, the term "polyphthalamides" should be understood as defining any polymer of which more than 70 mol. %, preferably more than 80 mol. %, more preferably more than 90 mol. % of the recurring units are formed by the polycondensation reaction between at least one phthalic acid and at least one diamine. The phthalic acid can be notably o-phthalic acid, isophthalic acid or terephthalic acid. The diamine can be notably 1,6-hexamethylenediamine, 1,9-nonanediamine, 1,10-diaminodecane 2-methyl-octanediamine, 2-methyl-1,5-pentanediamine or 1,4-diaminobutane; a C$_6$ and/or a C$_{10}$ diamine, especially 1,6-hexamethylenediamine and 1,10-diaminodecane are preferred. Suitable polyphthalamides are notably available as AMODEL® polyphthalamides from Solvay Advanced Polymers, L.L.C.

The polyphthalamide (PPA) of the invented composition is more preferably a polyterephthalamide. For the purpose of the present description, the term "polyterephthalamide" should be understood as defining any polymer of which more than 70 mol. %, preferably more than 80 mol. %, more preferably more than 90 mol. % of the recurring units are formed by the polycondensation reaction between at least terephthalic acid with at least one diamine. The diamine may be aliphatic or aromatic. It is preferably an aliphatic diamine selected from the group consisting of 1,6-hexamethylenediamine, 1,9-nonanediamine, 1,10-diaminodecane, 2-methyl-octanediamine, 2-methyl-1,5-pentanediamine or 1,4-diaminobutane.

Of course, more than one semi-aromatic polyamide may be used in the composition in accordance with the invention.

In a second embodiment, the semi-aromatic polyamide of the composition according to the present invention is preferably a class of polyamides consisting of PXDAs, i.e. aromatic polyamides comprising more than 50 mole % of recurring units formed by the polycondensation reaction between at least one aliphatic diacid and paraxylylenediamine. The aliphatic diacid can be chosen notably from oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tetradecanedioic acid [HOOC—(CH$_2$)$_{11}$—COOH] and 1,4-cyclohexane dicarboxylic acid. Sebacic acid, adipic acid and 1,4-cyclohexane dicarboxylic acid are preferred. Adipic acid or sebacic acid are even more preferred, and PXDAs derived from adipic acid or sebacic acid with paraxylylenediamine are usually referred to as PXD6 and PXD10 respectively.

Excellent results were obtained when the polyphthalamide is selected from the group consisting of PA 6T, PA9T, PA10T, PA11T, PA12T, PA6T/6I, PA6T/6I/10T/10I, PA6T/10T/6,10/10,10, PA6T/11 and PA10T/11.

The semi-aromatic polyamide may be semi-crystalline or amorphous.

When the semi-aromatic polyamide is semi-crystalline, it has a melting point advantageously greater than 220° C., preferably greater than 270° C., more preferably greater than 280° C., and still more preferably greater than 320° C. In addition, the semi-aromatic polyamide has a melting point advantageously of below 350° C., preferably below 340° C. and more preferably below 330° C.

The melting point of the semi-aromatic polyamide was measured by Differential Scanning calorimetry using ASTM D3418 with the following heating/cooling cycle: $1^{st}$ heating from room temperature up to 350° C. at a rate of 10° C./min, followed by cooling from 350° C. down to room temperature at a rate of 20° C./min, followed by $2^{nd}$ heating from room temperature up to 350° C. at a rate of 10° C./min. The melting point was measured during $2^{nd}$ heating.

The semi-aromatic polyamide is generally present in the polymer composition in an amount of at least 30 wt. %, preferably of at least 35 wt. %, more preferably of at least 40 wt. %, still more preferably of at least 45 wt. % and most preferably of at least 50 wt. %, based on the total weight of the composition. Besides, the semi-aromatic polyamide is generally present in the polymer composition in an amount of at most 85 wt. %, preferably of at most 80 wt. %, more preferably of at most 75 wt. %, still more preferably of at most 70 wt. % and most preferably of at most 65 wt. %, based on the total weight of the composition.

The Elemental Iron

The inventive composition further comprises elemental iron. Elemental iron is preferably in the form of particles, the majority of which having a small particle size, such as a powder. In general, the elemental iron has a weight average particle size of at most 450 μm, preferably at most 200 μm. It is further preferred that the elemental iron having a small particle size has a weight average particle size of at most 200 μm, more preferably at most 100 μm, and still more preferably at most 50 μm. On the other side, the elemental iron has a weight average particle size of at least 10 μm, preferably at least 13 μm. It is further preferred that the elemental iron having a small particle size has a weight average particle size of at least 15 μm, more preferably at least 18 μm, and still more preferably at least 20 μm.

The elemental iron of the present invention has preferably a weight average particle size of 10 to 50 μm, more preferably 15 to 45 μm, still more preferably 20 to 40 μm and most preferably 25 to 35 μm.

The weight average particle size is determined as $D_m$ according to ASTM standard D1921-89, method A. Preferably the size, to be understood as the largest dimension, of at least 99 wt. % of the elemental iron particles is at most 450 μm and preferably at most 200 μm, more preferably at most 100 μm, even more preferably at most 90 μm, still more preferably at most 80 μm and most preferably at most 70 μm.

Preferably the size, to be understood as the smallest dimension, of at least 99 wt. % of the elemental iron particles is at least 10 μm and preferably at least 15 μm, more preferably at least 20 μm and most preferably at least 25 μm.

The elemental iron in the polymer composition according to the present invention may be used in any amount, which can be varied over a wide range. The elemental iron has shown to be a very effective stabilizer, showing an effect already at very low amounts.

The elemental iron is generally present in the polymer composition in an amount of at least 0.1 wt. %, preferably of at least 0.2 wt. %, more preferably of at least 0.5 wt. %, still more preferably of at least 0.9 wt. % and most preferably of at least 1.0 wt. %, based on the total weight of the composition. Besides, the elemental iron is generally present in the polymer composition in an amount of at most 10 wt. %, based on the total weight of the composition. Higher amounts of elemental iron may be used, however without any additional effect on the heat ageing properties of the composition. More preferably, the elemental iron is generally present in the polymer composition in an amount of at most 5 wt. %, more preferably of at most 4 wt. %, still more preferably of at most 3 wt. % and most preferably of at most 2.5 wt. %, based on the total weight of the composition.

Excellent results were obtained when the elemental iron was used in an amount ranging from 0.1 to 5 wt. %, preferably from 0.5 to 3 wt. % and most preferably from 0.9 to 2.5 wt. %, based on the total weight of the polymer composition.

The Aliphatic Polyamide

The Applicant has surprisingly found that the presence of an aliphatic polyamide selected from PA 6 and PA 6,6 in combination with elemental iron improves the heat ageing performance of semi-aromatic polyamides.

The aliphatic polyamide of the composition according to the present invention is selected from PA 6 and PA 6,6. Excellent results were obtained with PA 6.

PA 6 is a polyamide synthesized by ring opening polymerization of caprolactam.

PA 6,6 is a polyamide synthesized by the polycondensation of 1,6-hexamethylene diamine and adipic acid.

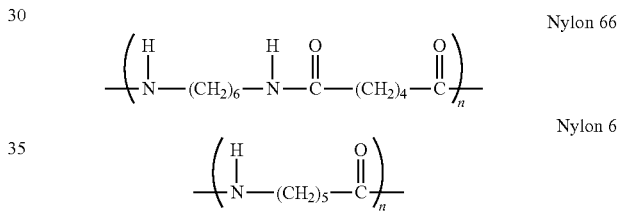

The at least one aliphatic polyamide is generally present in the polymer composition in an amount of at least 1 wt. %, preferably of at least 2 wt. %, more preferably of at least 2.5 wt. %, still more preferably of at least 3 wt. % and most preferably of at least 4 wt. %, based on the total weight of the composition. Besides, the at least one aliphatic polyamide is generally present in the polymer composition in an amount of at most 20 wt. %, preferably of at most 18 wt. %, more preferably of at most 16 wt. %, still more preferably of at most 14 wt. % and most preferably of at most 12 wt. %, based on the total weight of the composition.

Other Optional Additives

The composition in accordance with the invention can optionally comprise additional additives/components such as fillers, pigments, dyes, lubricants, thermal stabilizers, light stabilizers, flame retardants and antioxidants etc.

Fillers

A large selection of reinforcing fillers may be added to the composition according to the present invention. They are preferably selected from fibrous and particulate fillers. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5. Preferably, the aspect ratio of the reinforcing fibers is at least 10, more preferably at least 20, still more preferably at least 50.

Preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite etc. Still more preferably, it is selected from mica, kaolin, calcium silicate, magnesium carbonate and glass fiber etc.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

In a preferred embodiment of the present invention the reinforcing filler is chosen from wollastonite and glass fiber. Excellent results were obtained when glass fibers were used. Glass fibers may have a round cross-section or a non-circular cross-section.

Excellent results were obtained when the reinforcing filler was used in an amount of 20-60 wt. %, preferably of 30-50 wt. %, based on the total weight of the composition.

The fillers are contained in the polymer composition in a total amount of advantageously more than 15% by weight, preferably more than 20% by weight, still more preferably more than 25% by weight, and most preferably more than 30% by weight, based on the total weight of the polymer composition. On the other hand, reinforcing fibers are contained in the polymer composition in a total amount of advantageously less than 65% by weight, preferably less than 60% by weight, still more preferably less than 55% by weight, and most preferably less than 50% by weight, based on the total weight of the polymer composition.

Pigments and Dyes

The composition according to the present invention may further comprise pigments and dyes. It may notably comprise black pigments such as carbon black and nigrosine.

Lubricants

The composition according to the present invention may further comprise lubricants such as linear low density polyethylene, calcium or magnesium stearate, sodium montanate etc.

Further Stabilizers

The composition according to the present invention further comprises in another preferred embodiment, in addition to the elemental iron thermal stabilizer, at least a well known thermal stabilizer different from the elemental iron that further promote the heat ageing properties. They can typically be one or more selected from phenolic thermal stabilizers (such as Irganox 1098 or Irganox 1010, available from Ciba Specialty Chemicals), organic phosphites (such as Irgafos 168, available from Ciba Specialty Chemicals), aromatic amines, metals salts of elements from group IB, IIB, III and IV of the periodic Table and metal halides of alkaline and alkaline earth metals.

Preferably, the composition according to the present invention further comprises a combination of a copper salt and an alkaline metal halide. More preferably, it comprises a copper halide and an alkaline metal halide, such as CuI and KI. Most preferably, CuI and KI are used in a ratio varying from 1/6 to 1/10, preferably 1/7 to 1/9.

This further thermal stabilizer may be present in an amount of from 0.1 to 5 wt. %, preferably of from 0.2 to 2.5 wt. %.

Light stabilizers such as hindered amine light stabilizers (HALS) may also be present in the composition.

Flame Retardants

The composition according to the present invention may further comprise flame retardants such as halogen and halogen free flame retardants.

Another aspect of the present invention is related to a process for preparing the polymer composition as above described, wherein it comprises melt-mixing at least one semi-aromatic polyamide, at least one aliphatic polyamide selected from PA 6 and/or PA 6,6, and elemental iron.

The process according to the invention can be carried out by any known melt-mixing process that is suitable for preparing thermoplastic moulding compositions. Such a process is typically carried out by heating the thermoplastic polymer above the melting temperature or in case the thermoplastic polymer is an amorphous polymer above the glass transition temperature, of the thermoplastic polymer thereby forming a melt of the thermoplastic polymer. The process according to the invention can be carried out in a melt-mixing apparatus, for which any melt-mixing apparatus known to the man skilled in the art of preparing polymer compositions by melt mixing can be used. Suitable melt-mixing apparatus are, for example, kneaders, Banbury mixers, single-screw extruders and twin-screw extruders. Preferably, use is made of an extruder fitted with means for dosing all the desired components to the extruder, either to the extruder's throat or to the melt. In the process according to the invention the constituting components for forming the composition are fed to the melt-mixing apparatus and melt-mixed in that apparatus. The constituting components may be fed simultaneously as a powder mixture or granule mixer, also known-as dry-blend, or may be fed separately. The process according to the invention is not limited in the way the elemental iron is added. It may be added, for example, as a powder, a dry-blend or premix comprising the thermoplastic polymer in granulate form and the elemental iron in powder form, or as a masterbatch of finely dispersed elemental iron in a carrier polymer. Advantageously, the elemental iron is added in the form of a masterbatch, since this allows a better control of the dosing accuracy of the elemental iron when the elemental iron is added in small quantities relative to the thermoplastic polymer. The carrier polymer that can be used in the masterbatch may be the same as the thermoplastic polymer, as well as another polymer, such a lower melting thermoplastic polymer, an elastomer or a rubber. Non-limiting examples of such carriers include SBS rubber, EPDM rubber, polyethylene, polypropylene and ethylene/propylene copolymers.

The advantage of the inventive composition is that it shows a remarkable improvement in heat ageing properties, exhibited by a much better retention of the mechanical properties at elevated temperature, in respect of the known copper salt/potassium iodide containing compositions. Another advantage is that the composition could be prepared with a lower mass percent of heat stabilizer, relative to the total mass of the composition, to achieve the same or even higher level of heat ageing properties.

Preferred embodiments of the composition according to the invention directly relate to preferred embodiments of the process according to the invention and specific components used therein, as described above, and the reported advantages thereof.

The invention also relates to the use of a polymer composition according to the invention for the preparation of a molded part, as well as to a molded part comprising a composition according to the invention.

A further object of the present invention relates to the use of a molded part comprising the above mentioned polymer composition in a machine, an engine, an electric or electronic installation, such as automotive vehicles, general transport means, domestic appliances, oil and gas exploration equipments or general industry installations.

The advantage of the molded part according to the invention is that it has very good heat ageing properties. The molded part can have a primarily 2-dimensional shape, such as for engine covers. The molded may also have a more complex 3-dimensional shape, as is the case for many parts used in high temperature applications. Generally, the part has a thickness of at least 0.5 mm, though the parts may have a lower thickness as well. Preferably, the part has a thickness of at least 1 mm, more preferably at least 2 mm, and still more preferably at least 4 mm. The advantage of the part having a higher thickness is that the mechanical properties are better retained under heat ageing conditions at elevated temperature. More particular, the molded part is a molded part for use in machines and engines, which can be applied, for example, in automotive vehicles, such as personal cars, motor bikes, trucks and vans, general transport means, including trains, aviation and ships, domestic appliances, such as lawn mowers and small engines, and general industry installations, such as in pumps, compressors, conveyor belts, or a molded part for use in electric and electronic installations, such as in domestic power tools and portable power equipment. The part may be, for example, a bearing, a gear box, an engine cover, an air duct, an intake manifold, an intercooler end-cap, a castor, or a trolley part.

The invention furthermore relates to products, including automotive vehicles, general transport means, domestic appliances, and general industry installations, electric and electronic installations, comprising a molded part according to the invention. The advantage is that the service lifetime of the said products in respect to the necessary replacement of the said molded part due to deterioration of the molded part by exposure to elevated temperature is longer, and/or that the product can be operated at higher temperature, compared with a corresponding product comprising a molded part made of the known composition comprising a copper iodide/potassium iodide stabilizing system.

The invention is further illustrated with the following examples and comparative examples.

EXAMPLES

—Components and Ingredients Used:
(1) PA 1: Vicnyl 600, PA10,T/10,6 (92/8) available from Kingfa;
(2) PA 2: PA 6 Ultramid® 8202 HS from BASF;
(3) PA 3: Amodel A-4002, PA 6,T/6,6 (65/35) available from Solvay Specialty Polymers;
(3) Stabilizer: mixture of copper iodide and potassium iodide in a 1/9 ratio with a stearate binder;
(4) Compatibilizer: Fusabond® MB226 from Dupont™ (anhydride modified LLDPE);
(5) Elemental iron: SHELFPLUS™ $O_2$ 2400 from ALBIS Plastic Corporation, masterbatch containing 20 wt. % of elemental iron particles in polyethylene having a D99 particle size of 63 μm;
(6) Fiberglass 1: OCV 983 chopped strand 10 micron diameter commercialized by Owens Corning®;
(7) Fiberglass 2: HP3540 chopped strand 10 micron diameter commercialized by PPG Industries;
(8) Lubricant: Linear low density polyethylene (LLDPE) GRSN-9820 commercialized by Dow® Chemical.

Preparation of the Polymer Compositions

Examples E1, E2, E3 and comparative examples CE1, CE2 and CE3 were prepared by melt blending the ingredients listed in Table 1 in a 26 mm twin screw extruder (ZSK 26 by Coperion) operating at about 290° C. barrel setting using a screw speed of about 200 rpm, a throughput of 13.6 kg/hour and a melt temperature of about 310-325° C. The fiberglass 1 or 2 were added to the melt through a screw side feeder. Ingredient quantities shown in Table 1 are given in weight % on the basis of the total weight of the polymer composition.

The compounded mixture was extruded in the form of strands cooled in a water bath, chopped into granules and placed into sealed aluminum lined bags in order to prevent moisture pickup. The cooling and cutting conditions were adjusted to ensure that the materials were kept below 0.15 wt. % of moisture level.

TABLE 1

Nature and quantities of the ingredients of the prepared compositions

|  | CE1 | CE2 | CE3 | E1 | E2 | E3 |
|---|---|---|---|---|---|---|
| PA1 | 64.1 | 57.54 |  | 52.54 |  |  |
| PA2 |  |  |  | 5 | 5 | 10 |
| PA 3 |  |  | 57.54 |  | 52.54 | 47.54 |
| Stabilizer | 0.4 | 0.81 | 0.81 | 0.81 | 0.81 | 0.81 |
| Compatibilizer |  | 1.65 | 1.65 | 1.65 | 1.65 | 1.65 |
| Iron masterbatch |  | 5 | 5 | 5 | 5 | 5 |
| Lubricant | 0.5 |  |  |  |  |  |
| Fiberglass 1 | 35 |  |  |  |  |  |
| Fiberglass 2 |  | 35 | 35 | 35 | 35 | 35 |

Initial Properties of the Polymer Compositions

Initial mechanical tensile properties, i.e. stress at break (tensile strength) and strain at break (elongation at break) were measured according to ISO 527-2/1A and are reported in Tables 2 and 3 at aging time of 0 hour. Measurements were made on injection molded ISO tensile bars. Mold temperature for the test specimen ranged from 115-120° C. and melt temperature ranged from 315-330° C.

The thickness of the test bars was 4 mm and their width was of 10 mm. According to ISO 527-2/1A, the tensile strength and elongation were determined at a testing speed of 5 mm/min.

Thermal Oxidation Ageing

The test bars were heat aged in a re-circulating air oven (Blue M) at a temperature set at 230° C., according to the procedure detailed in ISO 2578. At various heat aging times, the test bars were removed from the oven, allowed to cool down to room temperature and sealed into aluminum lined bags until ready for testing. The tensile mechanical properties were then measured according to ISO 527 as described above. All values reported in Tables 2 and 3 are average values obtained from 5 specimens.

Tensile strength results of examples E1, CE1 and CE2 are also presented in FIG. 1.

TABLE 2

Tensile strength results in MPa

| Heat aging time in hours | CE1 | CE2 | CE3 | E1 | E2 | E3 |
|---|---|---|---|---|---|---|
| 0 | 220.82 | 181.87 | 185 | 183.28 | 192 | 193 |
| 48 | 157.28 | 152.55 | 148 | 156.02 | 148 | 156 |
| 96 | 126.4 | 151.25 | 128 | 144.04 | 131 | 145 |
| 500 | 109.55 | 97.04 | 143 | 168.76 | 136 | 140 |

TABLE 2-continued

Tensile strength results in MPa

| Heat aging time in hours | CE1 | CE2 | CE3 | E1 | E2 | E3 |
|---|---|---|---|---|---|---|
| 1000 | 28.6 | 83.26 | 144 | 167.69 | 138 | 146 |
| 2000 | CE | 45.2 | 146 | 180.3 | 146 | 158 |
| 3000 | CE | 0 | 155 | 185.75 | 152 | 172 |
| 4000 | CE | CE | 159 | 186.82 | 169 | 180 |
| 5000 | CE | CE | 128 | — | 158 | 175 |

*CE: complete embrittlement

TABLE 3

Tensile elongation results in %

| Heat aging time in hours | CE1 | CE2 | CE3 | E1 | E2 | E3 |
|---|---|---|---|---|---|---|
| 0 | 2.72 | 2.73 | 1.79 | 2.57 | 1.91 | 1.97 |
| 48 | 1.52 | 1.57 | 1.29 | 1.6 | 1.28 | 1.35 |
| 96 | 1.13 | 1.55 | 1.14 | 1.43 | 1.11 | 1.23 |
| 500 | 0.98 | 0.94 | 1.26 | 1.81 | 1.15 | 1.18 |
| 1000 | 0.44 | 0.84 | 1.26 | 1.84 | 1.15 | 1.24 |
| 2000 | CE | 0.64 | 1.3 | 2.03 | 1.26 | 1.4 |
| 3000 | CE | CE | 1.41 | 2.17 | 1.33 | 1.57 |
| 4000 | CE | CE | 1.43 | 2.2 | 1.5 | 1.66 |
| 5000 | CE | CE | 1.13 | — | 1.43 | 1.67 |

* CE: complete embrittlement

CE1 and CE2 do not appear to resist the long term or even the short term high heat treatment. On the other side, the example E1 according to the invention shows a very surprising response to the extreme heat treatment applied to it. Its tensile strength is somewhat reduced in the short term but comes back to the initial level after 2000 hours of heat treatment at 230° C. Even more surprisingly, the tensile strength is even improving to reach higher levels after 4000 hours of heat treatment.

The comparison of the results obtained with examples CE3, E2 and E3 demonstrate that the presence of the aliphatic polyamide in the composition improves also the heat ageing performance of semi-aromatic polyamide comprising lower amounts of aromatic recurring units. In this case, the benefit of the presence of the aliphatic polyamide is observed on the long term, i.e. by comparing tensile properties at 5000 hours.

These examples demonstrate the benefit of the presence of an aliphatic polyamide selected from PA 6 and PA 6,6 in semi-aromatic polyamides that are heat stabilized with elemental iron. This effect is even greater when the semi-aromatic polyamide has a high aromatic content (compare the wholly aromatic E1 example with E2 and E3 which have a lower aromatic content).

The advantage of the polymer composition having the good retention of tensile strength and/or elongation at break, tested after heat ageing, is that it can be used for molded parts and applications of molded parts made thereof, wherein the molded part has an extended lifetime or can be used at higher temperature, than a molded part not having such good retention of mechanical properties after heat ageing. A further advantage is that the polymer composition having the good retention of tensile strength and/or elongation at break can be used at a higher continuous use temperature, and/or that it can be used for a longer time at the same continuous use temperature.

Should the disclosure of any patents, patent applications, and publications which are incorporated herein by reference conflict with the description of the present application to the extent that it may render a term unclear, the present description shall take precedence.

The invention claimed is:

1. A polymer composition comprising:
   30 wt. % to 85 wt. % of at least one semi-aromatic polyamide;
   5 wt. % to 20 wt. % of at least one aliphatic polyamide selected from PA 6 and PA 6,6, and
   0.1 wt. % to 5 wt. % of elemental iron having a weight average particle size of at least 10 µm;
   wherein the weight percentages are based on a total weight of the polymer composition.

2. The polymer composition according to claim 1, wherein the at least one semi-aromatic polyamide comprises more than 70 mol % of aromatic recurring units.

3. The polymer composition according to claim 1, wherein the at least one semi-aromatic polyamide is a polyphthalamide.

4. The polymer composition according to claim 1, wherein the elemental iron has a weight average particle size of at most 100 µm.

5. The polymer composition according to claim 1, wherein the elemental iron has a weight average particle size of at least 15 µm.

6. The polymer composition according to claim 1, wherein the semi-aromatic polyamide has a melting point of greater than 220° C.

7. A process for preparing the polymer composition according to claim 1, wherein the process comprises melt-mixing the at least one semi-aromatic polyamide, the at least one aliphatic polyamide, and the elemental iron.

8. The process according to claim 7, wherein the at least one semi-aromatic polyamide comprises more than 70 mol % of aromatic recurring units.

9. A method for making a molded part, comprising molding the polymer composition according to claim 1 to form the molded part.

10. A molded part comprising the polymer composition according to claim 1.

11. A machine, an engine, or an electric or electronic installation comprising the molded part according to claim 10.

12. An automotive vehicle, general transport means, domestic appliance, or general industrial installation, comprising the molded part according to claim 10.

13. The polymer composition according to claim 1, wherein the semi-aromatic polyamide is formed from at least one phthalic acid and at least one diamine.

14. The polymer composition according to claim 13, wherein the phthalic acid is selected from o-phthalic acid, terephthalic acid, isophthalic acid, or mixtures thereof.

15. The polymer composition according to claim 13, wherein the diamine is selected from 1,6-hexamethylenediamine, 1,9-nonanediamine, 1,10-diaminodecane, 2-methyl-octanediamine, 2-methyl-1,5-pentanediamine, 1,4-diaminobutane, or mixtures thereof.

16. The polymer composition according to claim 13, wherein the semi-aromatic polyamide further comprises at least one lactam.

17. The polymer composition according to claim 16, wherein the lactam is caprolactam.

18. The polymer composition according to claim 1 comprising 0.5 wt. % to 3 wt. % of the elemental iron.

19. The polymer composition according to claim 1 comprising 0.9 wt. % to 2.5 wt. % of the elemental iron.

20. The polymer composition according to claim 1 comprising 5 wt. % to 12 wt. % of the at least one aliphatic polyamide.

21. The polymer composition according to claim 1 comprising 40 wt. % to 65 wt. % of the at least one semi-aromatic polyamide.

22. The polymer composition according to claim 1, further comprising 30 wt. % to 50 wt. % of at least one glass reinforcing filler.

* * * * *